(12) United States Patent
Russo et al.

(10) Patent No.: US 9,986,036 B2
(45) Date of Patent: May 29, 2018

(54) APPARATUS AND METHOD OF OPERATING A SYSTEM

(71) Applicant: GE Aviation Systems LLC, Grand Rapids, MI (US)

(72) Inventors: Andrew Neil Russo, Walker, MI (US); Richard John Reiffer, Jr., Middleville, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 307 days.

(21) Appl. No.: 14/800,817

(22) Filed: Jul. 16, 2015

(65) Prior Publication Data

US 2017/0019478 A1   Jan. 19, 2017

(51) Int. Cl.
*H04L 29/08*    (2006.01)
*H04L 12/40*    (2006.01)
*H04L 12/935*   (2013.01)
*H04L 12/879*   (2013.01)

(52) U.S. Cl.
CPC .............. *H04L 67/12* (2013.01); *H04L 12/40* (2013.01); *H04L 49/30* (2013.01); *H04L 49/901* (2013.01); *H04L 2012/4028* (2013.01)

(58) Field of Classification Search
CPC . H04L 12/40; H04L 2012/4028; H04L 49/30; H04L 49/901; H04L 67/12
USPC ......................................................... 370/412
See application file for complete search history.

(56) References Cited

U.S. PATENT DOCUMENTS

| | | | |
|---|---|---|---|
| 8,103,809 B1 | 1/2012 | Michels et al. | |
| 2003/0158963 A1* | 8/2003 | Sturdy | H04L 12/6418 709/238 |
| 2007/0047657 A1* | 3/2007 | Toma | G10L 19/012 375/240.24 |
| 2008/0043768 A1* | 2/2008 | Lopez | H04L 47/2416 370/412 |
| 2008/0112439 A1* | 5/2008 | Vestal | H04J 3/0661 370/516 |
| 2009/0019303 A1* | 1/2009 | Rowland | G06F 1/08 713/501 |
| 2009/0073984 A1* | 3/2009 | Jackson | H04B 7/18506 370/394 |
| 2011/0251739 A1 | 10/2011 | Tomas et al. | |
| 2011/0296379 A1* | 12/2011 | McCready | G06F 9/4421 717/121 |
| 2012/0027022 A1* | 2/2012 | Birkedahl | H04L 12/4641 370/401 |

(Continued)

OTHER PUBLICATIONS

Alena et al., "Communications for Integrated Modular Avionics", Mar. 2007, NASA Ames Research Center, Proceeding of IEEE Aerospace Conference, Big Sky, MT, pp. 1-18.*

(Continued)

*Primary Examiner* — Un C Cho
*Assistant Examiner* — Shah Rahman
(74) *Attorney, Agent, or Firm* — General Electric Company; Brian P. Overbeck

(57) ABSTRACT

An apparatus and method of operating a system includes receiving, at a network interface configured for specialized network protocol networks, a set of data frames and storing the received set of data frames for later retrieval, and retrieving a subset of the data frames from the network interface by a retrieval module.

20 Claims, 6 Drawing Sheets

(56) References Cited

U.S. PATENT DOCUMENTS

| | | | | |
|---|---|---|---|---|
| 2012/0207183 A1* | 8/2012 | Bobrek | ............... | H04J 3/0641 |
| | | | | 370/511 |
| 2012/0260180 A1* | 10/2012 | Herzberg | ........... | G05B 23/0221 |
| | | | | 715/736 |
| 2013/0051396 A1* | 2/2013 | Hall | ..................... | H04L 43/106 |
| | | | | 370/397 |
| 2013/0138271 A1* | 5/2013 | Danielsson | ........... | H04L 67/322 |
| | | | | 701/3 |
| 2013/0208630 A1* | 8/2013 | Bobrek | .................. | H04L 67/12 |
| | | | | 370/276 |
| 2014/0313943 A1* | 10/2014 | Lopez | ...................... | H04L 5/14 |
| | | | | 370/276 |
| 2014/0317220 A1 | 10/2014 | Karlsson et al. | | |
| 2015/0319010 A1* | 11/2015 | Traversone | ........... | H04L 49/351 |
| | | | | 370/294 |
| 2016/0154391 A1* | 6/2016 | Pavaskar | ............... | G05B 15/02 |
| | | | | 701/3 |

OTHER PUBLICATIONS

Condor Engineering, "AFDX Protocol Tutorial", 2005, Condor Engineering, pp. 18-55.*

GB Search Report issued in connection with corresponding GB Application No. 1612161.8 dated Dec. 13, 2016.

* cited by examiner

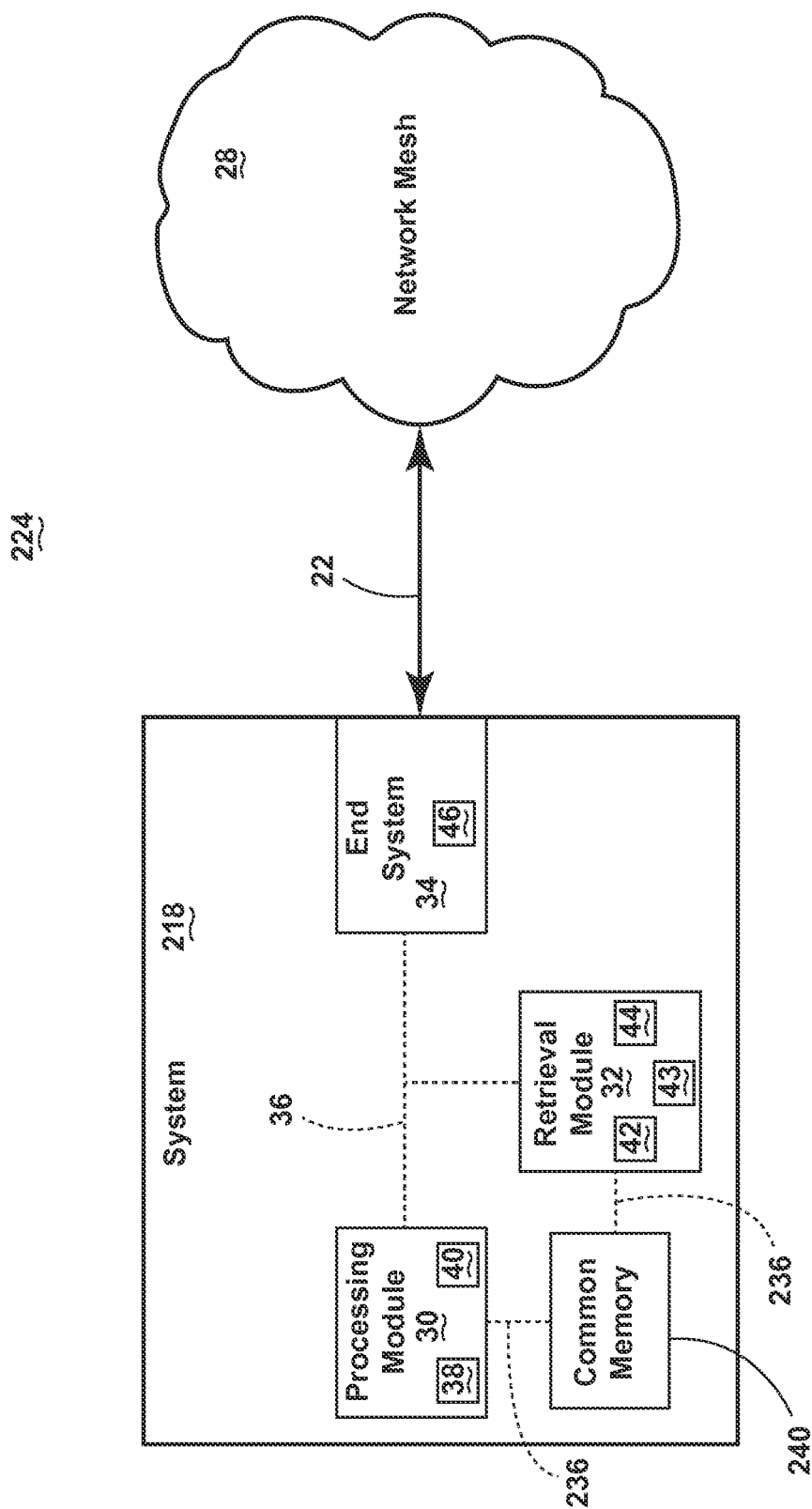

APPARATUS AND METHOD OF OPERATING A SYSTEM

BACKGROUND OF THE INVENTION

For contemporary aircraft, an avionics 'platform' consists of a variety of elements such as sensors, sensor data concentrators, a data communications network, radio frequency sensors and communication equipment, computational elements, effectors, and graphical displays. These components must share information with other components over the data communications network.

Legacy incarnations of these platform elements are in the form of individual subsystem elements often referred to as "federated systems". A federated system is an application-specific subsystem in a self-contained package having its own dedicated logic, processors, and input/output interfaces. Multiple and separated federated systems rely on common subsets of data sources, but lack the sharing of processing resources and interfaces among federated systems.

Previous efforts to reduce the reliance on federated systems resulted in the introduction of the ARINC 653 and ARINC 664 standards. ARINC 653 (A653) is a software specification for space and time partitioning in which an application, e.g., associated with a federated system function, is granted its own time slice partition and its own memory space partition in which to execute. ARINC 664 part 7 (A664) defines how commercial off-the-shelf networking components will be used for Aircraft Data Networks that enables what were multiple federated system functions to be hosted on a common processor and to share a common interface and wiring to an avionics data network.

In these systems, data is sampled, published, and transmitted at a higher frequency, and an application executing in an ARINC 653 partition is run more frequently in order to ensure that the results produced by an application have sufficiently low input-data-sample-time-to-processed-output delay. Both the frequency of data publication rate and the frequency of application execution tend to be higher than would otherwise be necessary if data and its processing were synchronized.

Systems on an avionics data network can utilize the data published on the network to perform processing functions for the aircraft. Example systems can include, but are not limited to flight control computers or aircraft health management units. The system can further include an end system or network interface unit configured to utilize a specialized data protocol of the avionics data networks defined by, for example, the A664 specification. The end systems include specialized hardware and software components that are designed to operate effectively and reliably with the avionics data networks, but are not optimized to operate efficiently with the processing functions of the systems.

BRIEF DESCRIPTION OF THE INVENTION

In one aspect, an aircraft communications system includes an application-specific integrated circuit end system configured to interface with an ARINC 664 part 7 (A664) network protocol and having a data ingress port to receive a set of data frames transmitted from the A664 network protocol, and a storage unit for storing the set of data frames received by the data ingress port, a retrieval module configured to interface with the end system and having a predetermined set of interactions for retrieving an identified set of data frames from the storage unit of the end system, and a processing module configured to interface with the retrieval module and having a first processor configured to identify a subset of the data frames received by the end system for processing operations and to perform processing operations on the subset of data frames. The processing module identifies the subset of data frames necessary for processing operations and provides the identified subset of the data frames to the retrieval module for retrieval from the end system, such that the processing module is available to perform processing operations during the retrieval of the subset of the data frames by the retrieval module.

In another aspect, a method of operating an aircraft communications system includes receiving, by an end system, at an ARINC 664 part 7 (A664) network interface configured for the A664 network protocol, a set of data frames and storing the received set of data frames for later retrieval, identifying, by a processing module, a list of a subset of the data frames for the processing module, providing, by the processing module, the identified list of the subset of data frames to a retrieval module, retrieving, by the retrieval module, the subset of data frames identified by the list from the A664 network interface, while the processing module is available to complete other tasks, and upon completion of the retrieving, providing the subset of data frames identified by the list to the processing module.

In yet another aspect, a method of operating an aircraft communications system includes receiving, by an end system, at an ARINC 664 part 7 (A664) network interface configured for the A664 network protocol, a set of data frames and storing the received set of data frames for later retrieval, identifying, by a processing module, a list of a subset of the data frames for the processing module, providing, by the processing module, the identified list of the subset of data frames to a retrieval module, retrieving, by the retrieval module, the subset of data frames identified by the list from the A664 network interface, and upon completion of the retrieving, providing the subset of data frames identified by the list to the processing module. The processing module performs a set of processing routines not including the retrieving the subset of data frames identified by the list.

BRIEF DESCRIPTION OF THE DRAWINGS

In the drawings:

FIG. 6 is a schematic view of another alternative system of the avionics data network wherein the retrieval module and the processing module share a commonly accessible memory.

DESCRIPTION OF EMBODIMENTS OF THE INVENTION

The embodiments of the invention described herein are provided with respect to a specialized avionics data protocol, but it will be understood that the apparatus and method described herein can be implemented in any environment using a data communications network interconnecting a set of data-generating components with a set of data-consuming components. Embodiments of the disclosure can include data communications networks configured to operate according to defined network characteristics or specifications. For example, contemporary aircraft operate a set of components interconnected by way of a data network defined by a network standard, such as the A664 specification, incorporated herein in its entirety. The A664 specification defines compliant network operations including, but not limited to, redundancy, dedicated bandwidth, deterministic quality of service, and network switching performance.

Figure 1:
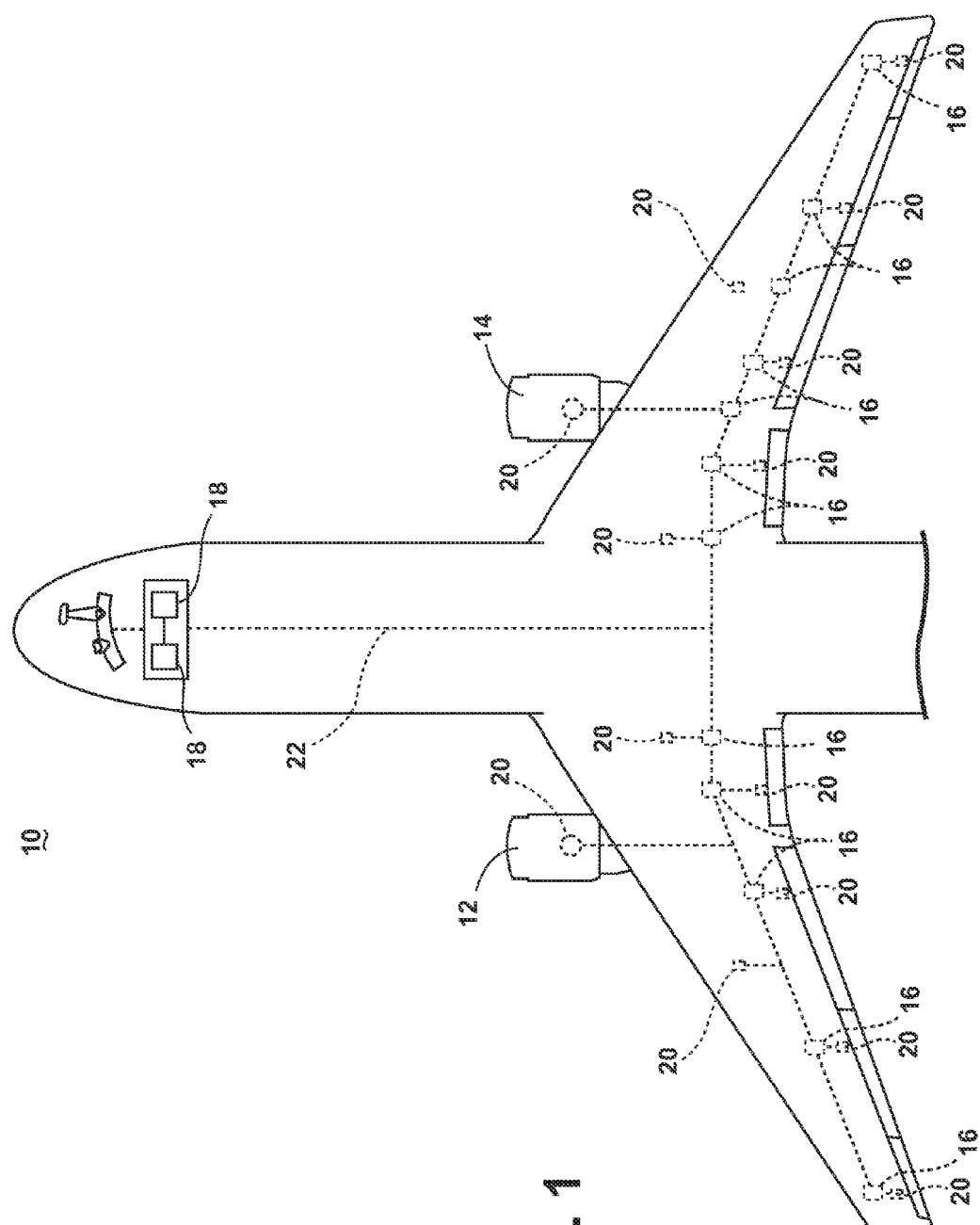
FIG. 1 is a top down schematic view of the aircraft and avionics data network architecture of an aircraft.

As illustrated in FIG. 1, an aircraft 10 can include at least one propulsion engine, shown as a left and right engine system 12. The aircraft 10 can further include one or more systems 18 or aircraft computers, including, but not limited to data storage or processing units, or functional systems such as the flight management system, autopilot system, or aircraft health management units, and a set of fixed aircraft components, such as line-replaceable units (LRU) 20, or modular components of a vehicle or aircraft. As used herein, a "system" 18 can include any system configured to perform a particular or specialized function for the aircraft. In the aircraft environment, the systems 18 or LRUs 20 can be designed to operate according to a particular operation, interoperability, or form factor standards, such as those defined by ARINC series standards. In the exemplary embodiment illustrated, the systems 18 can be positioned near the nose or cockpit of the aircraft 10 and the LRUs 20 can be positioned through the aircraft 10, however the illustrated positions are not germane to embodiments of the disclosure, and embodiments are envisioned wherein any placement or location of the respective systems 18 or LRUs 20 are possible. The systems 18 and LRUs 20 can be configured to be communicatively coupled by way of a series of data transmission pathways 22, network relays, or network switches 16. The data transmission pathways 22 can include a physical connection between the respective components 18, 20, such as a wired connection including Ethernet, or can include wireless transmission connections, including, but not limited to, Wi-Fi (e.g. 802.11 networks), Bluetooth, and the like. Collectively, the systems 18, LRUs 20, pathways 22, and switches 16 can form an avionics data network for the aircraft.

The LRUs 20 can include, for example, entirely contained systems, sensors, radios, or other auxiliary equipment to manage or operate aircraft functions. At least a set of systems 18 or LRUs 20 can, for example, generate data, which can be modified, computed, or processed prior to, or in preparation for packaging the data into data frames to be transmitted over the avionics data network by way of the pathways 22 or switches 16. At least another set of systems 18 or LRUs 20 can, for example, consume the data transmitted over the avionics data network. In some instances, a single system 18 or LRU 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 embodiment is merely one non-limiting example of an aircraft 10 that can be used in embodiments of the invention described herein. Particularities of the illustrated aircraft 10 embodiment, including relative size, length, number of engines, type of engines, and location of various components are not germane to the embodiments of the invention, unless otherwise noted.

In some example components, such as the systems 18 or LRUs 20, the components can be removably fixed to the aircraft for maintenance, diagnostics, or repair purposes, but statically fixed during, for example, flight. Additionally, while systems 18 and LRUs 20 are described, any data generating or data receiving or consuming components fixed relative to an aircraft can be included as embodiments of the invention as fixed components. For example, systems such as a flight management system, primary flight display, cockpit display system, autopilot, aircraft health management units, or autoland systems can be considered fixed components, as used herein.

Figure 2:
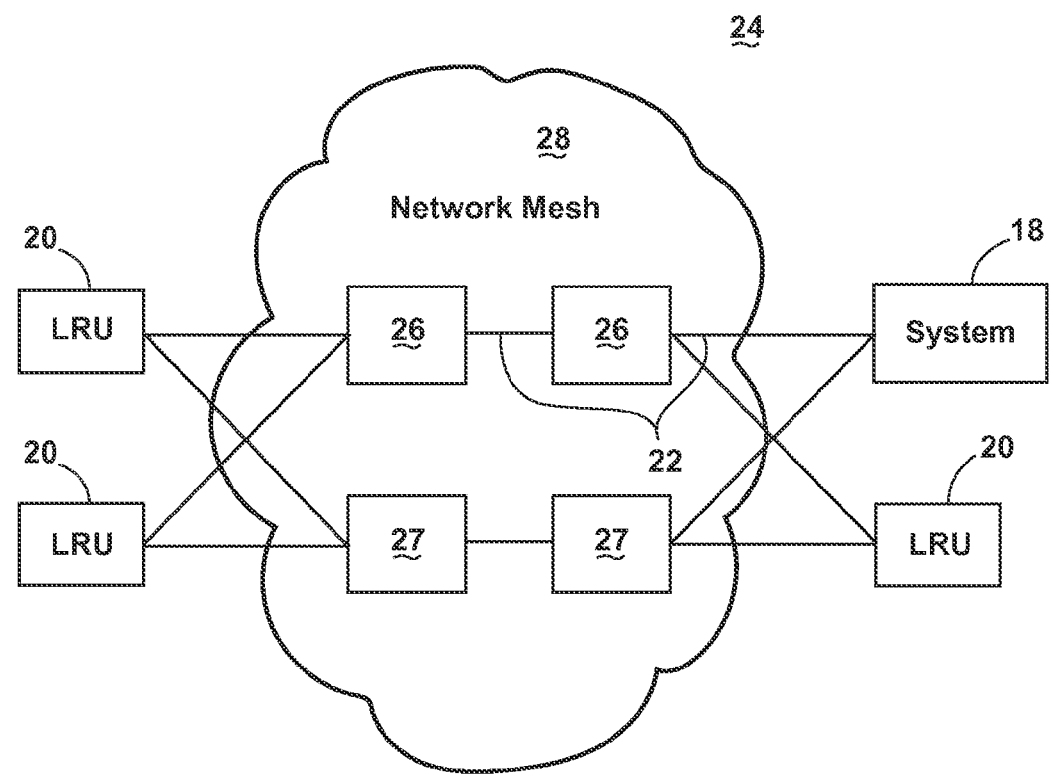
FIG. 2 is a schematic view of the avionics data network of FIG. 1.

FIG. 2 illustrates a schematic view of an avionics data network 24 in compliance with the A664 specification, according to embodiments of the disclosure. The avionics data network 24 can include, but is not limited to, a set of redundant network switching units, such as first set of switching units 26 in a first path and a second set of switching units 27 in a second, or redundant, path. The first and second switching units 26, 27 collectively define a network mesh 28 for routing the transmission of data frames to and from the systems 18 and LRUs 20, via the transmission pathways 22. The network mesh 28 is further shown having a set of transmission pathways 22 between the network switching units 26 to provide redundancy in transmission pathways 22. The embodiment of the disclosure illustrated in FIG. 2 is merely one representation of the avionics data network 24, and alternative configurations, organization, and component quantities, including, but not limited to, systems 18, LRUs 20, or network switching units 26, are envisioned.

Figure 3:
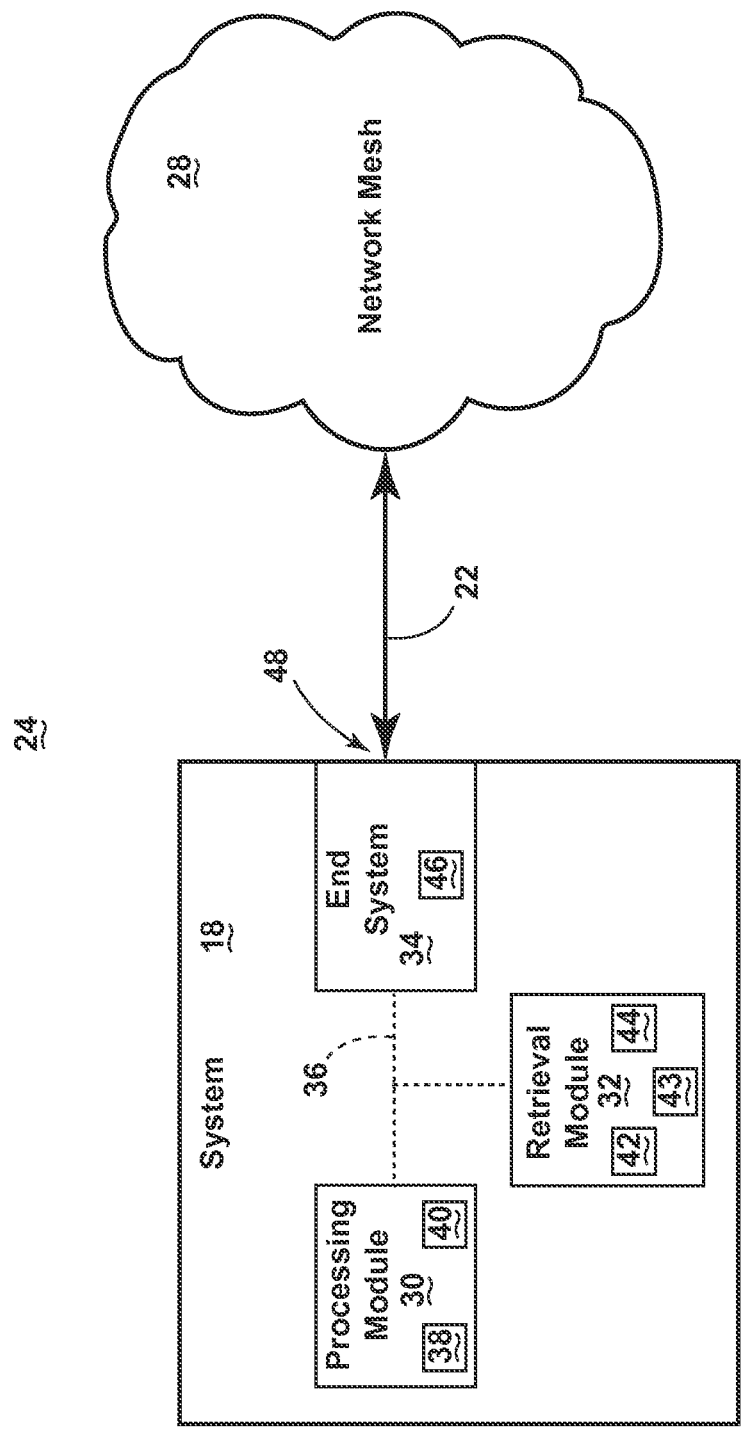
FIG. 3 is a schematic view of a system of the avionics data network having a retrieval module.

Turning now to FIG. 3, a simplified avionics data network 24 is illustrated, wherein a single system 18 is illustrated communicatively coupled with the network mesh 28, by way of a corresponding transmission pathway 22. While only a single system 18 is illustrated for ease of understanding, it will be understood that any number of, or subset of the systems 18 of the avionics data network 24 can be further configured, as shown. Moreover, embodiments of the disclosure can include any of the aforementioned systems 18 or LRUs 20, configured as described herein.

The system 18 can further include a processing module 30, a retrieval module 32, and an end system 34 or network interface unit, communicatively coupled by way of a communications data bus 36 internal to the system 18, such as a peripheral component interconnect bus (PCI bus), PCI express bus, or another system bus connection or interface. As shown, the processing module 30 can further include, for example, a first processor 38 and a first memory 40 or data storage device. The retrieval module 32 can further include a set of interactions 42 for retrieving a set of data, a second processor 43, and a second memory 44 or data storage device. Finally, the end system 34 can be an application-specific integrated circuit (ASIC) configured to provide functionality for a particular, predefined purpose, such as interfacing with an A664 network protocol, and can further include a third memory 46 or data storage device and a physical interface 48 or data ingress port for connecting or coupling to the specialized network, network mesh 28, or specialized network protocol. One example of a physical interface 48 for the end system 34 can include, but is not limited to, an Ethernet port configured to receive a transmission pathway 22 in the form of an Ethernet cable.

The first, second, or third memory 40, 44, 46 can include, but is not limited to, random access memory (RAM), flash memory, or one or more different types of writable portable electronic memory, etc., or any suitable combination of these types of memory. The processor 38 can be operably coupled with the first memory 40 such that one of the processor 38 and the first memory 40 can include all or a portion of a computer program having an executable instruction set for controlling the operation of the processing module 30. Likewise, the set of interactions 42 or the second processor 43 can be operably coupled with the second memory 44 such that one of the set of interactions 42, second processor 43, or second memory 44 can include all or a portion of a computer program having an executable instruction set for controlling the operation of the retrieval module 32.

The programs can include a computer program product that can include machine-readable media for carrying or having machine-executable instructions or data structures stored thereon. Such machine-readable media can be any available media, which can be accessed by a general purpose or special purpose computer or other machine with a processor 38, 43. Generally, such a computer program can include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, processor 38, 43, or special purpose processing machine to perform certain functions or group of functions.

The end system 34 is configured to at least receive a set of data frames transmitted from the network mesh 28 to the physical interface 48, and can be further configured to store at least a subset of the received data frames to the third memory 46 for later retrieval. The subset of the received data frames to the third memory 46 can be defined by the system 18, the processing module 30, the retrieval module 32, or any other controllable component connected with the network mesh 28. While the end system 34 is described as configured to receive a set of data frames at the physical interface 48, it will be understood that the system 18 or end system 34 can be further configured to transmit or send one or more data frames, by way of the physical interface 48, to the network mesh 28 as well. In this sense, the system 18 or end system 34 can be bi-directionally connected with the network mesh 28, as demonstrated by the doubled arrow transmission pathway 22.

The stored subset of data frames can include varying types of data frames, as defined by the specialized network protocol. For example, the A664 network protocol defines sampling data frame messages, wherein only a single data frame can be stored for a particular attribute, such as, but not limited to, current altitude. When a new sample, or new sampling period generates an updated current altitude value, that value is transmitted, via the network mesh 28, to the system 18, received as a data frame at the physical interface 48, and can be stored in the third memory, overwriting the prior current altitude sampling data frame message, for later retrieval. Another example of varying types of data frames for the A664 network protocol includes queueing messages, which are not overwritten or deleted when new data frames are received, but are rather queued in a first-in, first-out organization style, and wherein all queueing messages are sequentially stored or retrieved, as defined by the network protocol.

The processing module 30 can be configured to connect with at least one of the retrieval module 32 or the end system 34, and can be further configured to perform some processing function, processing operation, or processing task on a subset of the data frames stored in the first memory 40 of the processing module 30. The processing of the processing module 30 may, for example, include execution of a computer program or the like, described above, by the first processor 38. Embodiments of the disclosure envision instances where the data frames stored in the first memory 40 are copies or transmissions of data frames stored in the third memory 46 of the end system 34.

Conventional systems 18 can achieve the copying or transmission of the data frames stored in the third memory 46 to the first memory 40 by allowing the processing module 30 to directly interface or communicate with the end system 34 by way of a known or predetermined set of interactions, for example, via the communications data bus 36 to perform the copying or transmission. The known or predetermined set of interaction can include, but is not limited to, a set of retrieval interactions that can be defined or controlled by, for instance, the network interface, the specialized network protocol, or the avionics data network 24. In this sense, the first processor 38 is configured to execute a computer program or the like to interact with the end system 34 to retrieve the data frames from the third memory 46. The first processor 38 processing capabilities can be a limiting resource in these conventional systems 18 due to the inefficient interactions in retrieving the data frames of the third memory 46.

In one example retrieval interaction with the end system 34 to retrieve a data frame from the third memory 46, the first processor 38 can first determine what data frame or data frames are needed for processing tasks or operations. The first processor 38 then communicates with the end system 34 to, for instance, continually read a register value for the desired data frame until the register indicates the desired data frame buffer or portion of the third memory 46 is not busy. During the continually reading the register, the first processor 38 is waiting for access, and unable to complete other processing tasks. When the desired data frame portion of the third memory 46 is not busy, the first processor 38 can write a register value to lock the desired data frame portion of the third memory 46 in order to retrieve the desired data frame.

During the retrieving of the desired data frame, the first processor 38 continually polls a second register value while the end system 34 retrieves the desired data frame (e.g. in the example of sampling messages, the most recent data frame) or data frames (e.g. in the example of queueing messages, all queued messages) from the third memory 46, and stores the desired data frames in a buffer for copying or transmitting to the processing module 30. In one example, the polling of the second register value can take up to 1.7 microseconds for each repeated polling period. Again, during the polling periods, the first processor 38 is waiting for desired data frames to be prepared for copying or transmission, and unable to complete other processing tasks. When the desired data frames are in the buffer for copying or transmitting to the processing module 30, the copying or transmission occurs, and the desired data frames are stored in the first memory of the processing module. Finally, the first processor 38 writes a register value to unlock the desired data frame portion of the third memory 46 after the desired data frame has been stored in the first memory 40, allowing the end system 34 to update the relevant portions of the third memory 46, as needed. This retrieval operation for conventional systems 18 then repeats for each of the desired data frames, if more than one data frame is requested for processing tasks by the processing module 30. While only a single retrieval process is described herein, alternative retrieval processes are envisioned having inefficiencies of first processor 38 utilization.

The collective delays or mandatory waiting periods of the retrieval process described herein is a burden on the processing module 30 or first processor 38, as the collective periods of time are inefficient or result in underutilization of the first processor 38, yet are not long enough period, individually, to justify a processing switch to execute other processing tasks on the first processor 38.

Embodiments of the disclosure provide for an system 18 that improves over conventional systems 18 by including the retrieval module 32 configured to retrieve desired data frames on for, on behalf of, or in delegation of the processing module 30, such that the first processor 38 of the processing module 30 can remain free to perform other processing tasks or code execution while the desired data frames are retrieved by the retrieval module 32. In this sense, the retrieval module 32 is communicatively coupled with the end system 34 and the processing module 30.

The processing module 30 is configured to identify the subset of desired data frames necessary to accomplish a processing task, and provide the identified subset of desired data frames to the retrieval module 32. The first processor 38 of the processing module 30 is then free to perform other processing tasks. The retrieval module 32 receives the identified subset of desired data frames from the processing module 30, and executes a retrieval process, according to the set of interactions 42 for retrieving the subset of desired data frames, by way of the second processor 43 in the retrieval module 32. The set of interactions 42 can be configured and executed by the retrieval module 32 or second processor 43 to operably allow the retrieval module 32 to mimic, match, emulate, or otherwise stand in for and operate the conventional set of interactions, defined above, such as the set of retrieval interactions. In this sense, the set of interactions 42 can include specific algorithms, programming modules, computer code, or the like to enable the second processor 43 to retrieve the identified subset of desired data frames from the end system 34 while providing the same interactions with the end system 34 that the end system 34 would otherwise experience in the conventional systems. Embodiments of the disclosure can include configurations wherein, for example, the second processor 43 can be a field-programmable gate array (FPGA), or an application-specific integrated circuit (ASIC), and include as a subcomponent, for example, via logic design or programming, the set of interactions 42.

In this sense, the retrieval module 32 or second processor 43 is configured to stand in for the processing module 30 or first processor 38 of the conventional systems 18, and retrieves the desired subset of data frames from the third memory 46 of the end system 34 according to the defined set of interactions 42 (for example, interactions that would otherwise have been performed by the first processor 38, as described above), and stores the retrieved subset of desired data frames in the second memory 44 of the retrieval module 32. Additionally, the retrieval module 32 or second processor 43 can be configured to perform processing or pre-processing tasks on one or more data frames stored in the second memory 44 that would have otherwise been performed by the first processor 38. For example, such pre-processing tasks can include calculating values from the data frames or packaging the data frames into numbers, values, or different data usable by at least one of an algorithm or computer program executed by the first processor 38, in preparation for said execution. Additional pre-processing tasks can be included in order to off-load, balance, or make available utilization as desired on the first processor 38 or second processor 43.

Once the subset of desired data frames is stored in the second memory 44 and the interactions between the end system 34 and the retrieval module 32 have completed or terminated, the retrieval module 32 can be configured to provide the subset of desired data frames to the first processor 38, the first memory 40, or the processing module 30. For example, the retrieval module 32 may communicate a flag, indicator, or interrupt to the processing module 30 to indicate the set of desired data frames are available for transmission. When ready to receive the copying or transmission of the set of desired data frames, the processing module 30 or first processor 38 can initiate the copying or transmission of the set of desired data frames, in bulk, from the second memory 44 to the first memory 40, without any of the aforementioned delays or mandatory waiting periods that originated in the end system 34. The bulk transfer of the set of desired data frames limits the amount of inefficiencies or underutilization by the first processor 38 while receiving data frames.

Embodiments of the disclosure can include, for example, utilizing the retrieval module 32, as described herein, to perform retrieval of the subset of desired data frames on a per-request or per-processing-task, as determined by the processing module 30. In another embodiment of the disclosure, the retrieval module 32 can perform batched retrieval of a subset of desired data frames, including multiple requests for multiple processing functions. For example, at least one of the processing module 30 or retrieval module 32 can keep a temporary record or queue of desired data frames as they are identified by the first processor 38 or processing module 30, and execute a batch retrieval of the queue of desired data frames, for instance, based on a number of total identified desired data frames in the queue (e.g. retrieve the desired data frames when ten data frames are identified and queued), based on the total number of processing tasks having desired data frames queued (e.g. retrieve the desired data frames when three different processing tasks are awaiting queued desired data frames); based on a timing component (e.g. initiate retrieval the desired data frames identified in the queue each thirty seconds); or based on any combination of the above-described examples.

Alternatively, or in addition to the previously described batch queueing, the first processor 38, processing module 30, or the retrieval module 32 can be configured to interrupt the queueing of desired data frames or any active retrieving occurring by the retrieval module 32 to initiate a retrieving by the retrieval module 32 of critical or time-sensitive desired data frames identified by the first processor 39 or processing module 30. In such an example, the processing module 30 can alternatively perform the retrieval of the desired data frames itself, by bypassing the retrieval module 32 altogether.

Figure 4:
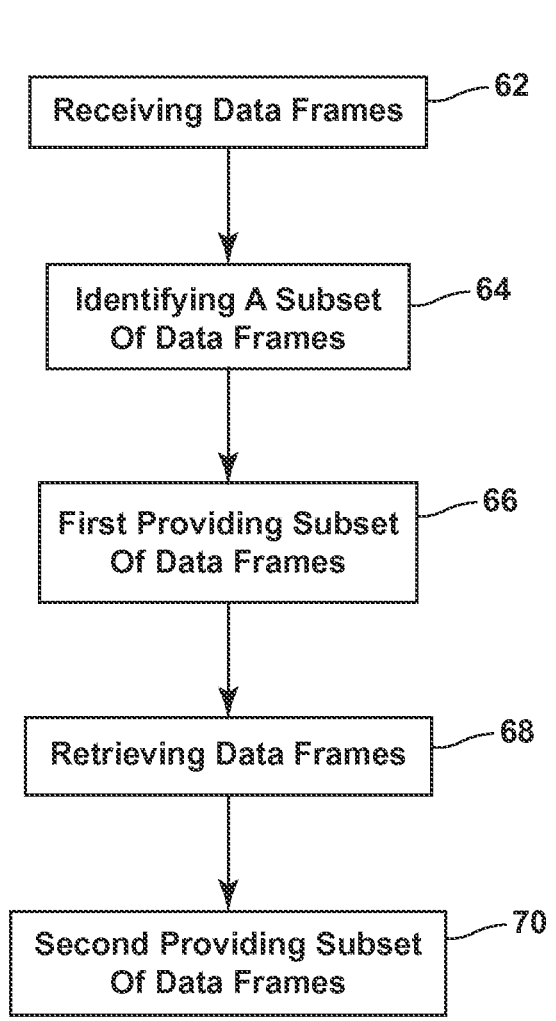
FIG. 4 is a flow chart showing a method of operating the system of the avionics data network having a retrieval module.

FIG. 4 illustrates an exemplary method 60 for operating the avionics data network 24 architecture described herein. First, a receiving data frames step 62 occurs by receiving, at a network interface configured for specialized network protocol networks, such as the physical interface 48, a set of data frames and storing the received set of data frames for later retrieval. Next, in an identifying step 64, the processing module 30 identifies a subset of the data frames necessary for processing by the processing module 30. Following the identifying step 64 is a first providing step 66 which includes providing the identified subset of data frames to the retrieval module 32. The retrieval module 32 then performs a retrieving step 68, including retrieving the identified subset of data frames by the retrieval module 32 while the processing module 30 is free or available to complete other tasks. For example, the processing module 30 can be configured to perform a set of processing routines that do not include the retrieving step 68 wherein the subset of data frames are retrieved by the retrieval module 32. Thus, the processing module 30 can perform at least a subset of the processing routines contemporaneously with the retrieving step 68 by the retrieval module 32. In this sense, the processing module 30 can "off-load" the retrieving step 68 to the retrieval module 32 such that the processing module 30 can perform at least a subset of the set of processing routines. The processing module 30 can be further configured to identify a subset of the processing routines that are dependent upon data frames that have yet to be retrieved by the retrieval module 32. The processing module 30 can, for example, avoid, ignore, or delay the subset of dependent processing routines until the retrieval module 32 provides the respective subset of data frames to the processing module 30. Finally, upon completion of the retrieving step 68, a second providing step 70 occurs wherein the retrieval module 32 provides the subset of the data frames to the processing module 30.

The sequence depicted is for illustrative purposes only and is not meant to limit the method 60 in any way as it is understood that the portions of the method can proceed in a different logical order, additional or intervening portions can be included, or described portions of the method can be divided into multiple portions, or described portions of the method can be omitted without detracting from the described method. For example, the method 60 can perform additional steps including, but not limited to, retrieving the identified subset of data frames according to the set of interactions 42, or providing indication to the processing module 30 that the retrieving step 68 has completed.

Figure 5:
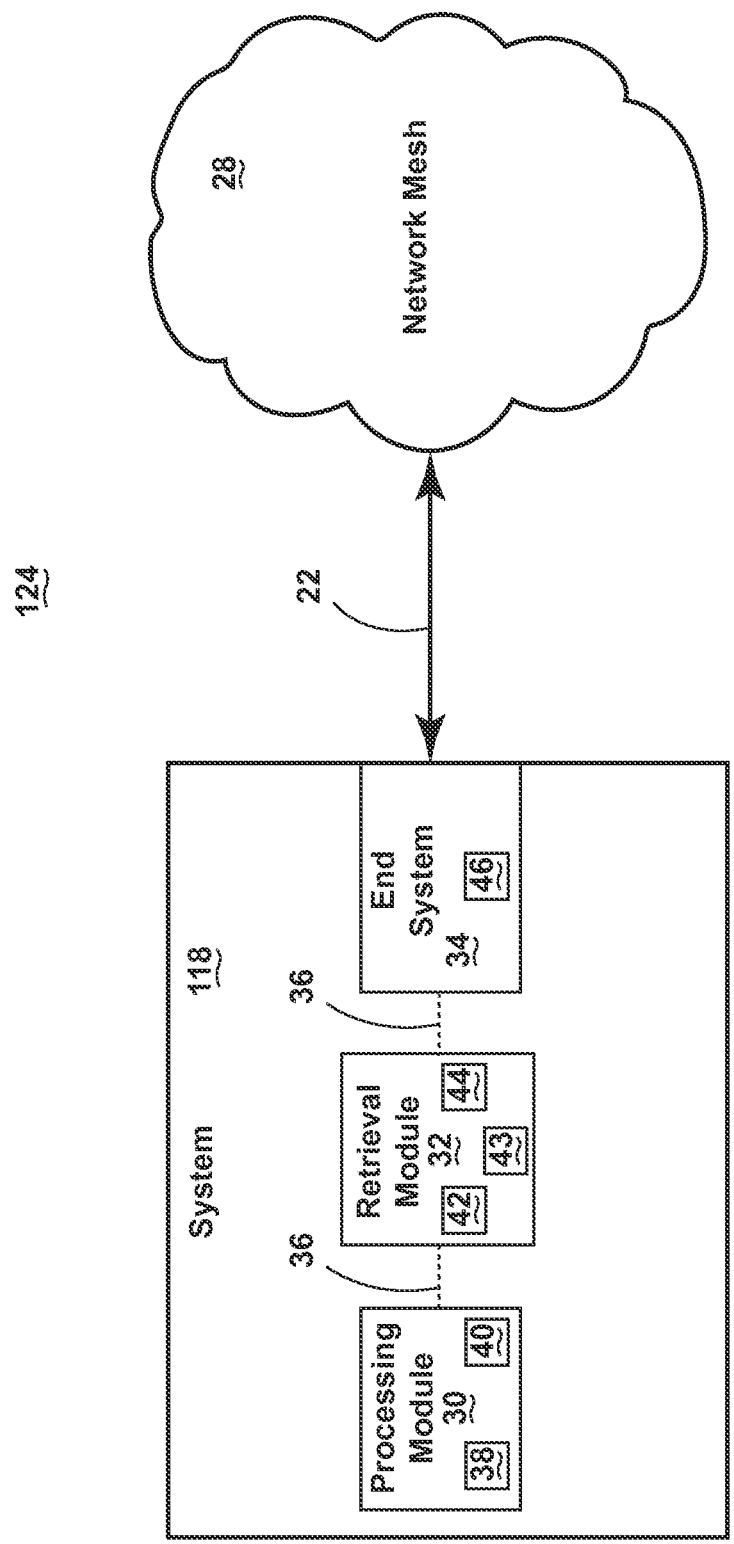
FIG. 5 is a schematic view of an alternative system of the avionics data network having a retrieval module operably positioned between the processing module and the end system.

FIG. 5 illustrates an alternative avionics data network 124 according to a second embodiment of the disclosure. The second embodiment has some similarities to the first embodiment; therefore, like parts will be identified with like numerals increased by 100, with it being understood that the description of the like parts of the first embodiment applies to the second embodiment, unless otherwise noted. A difference between the first embodiment and the second embodiment is that the system 118 can be configured such that the retrieval module 32 is positioned between the processing module 30 and the end system 34. In this configuration, all copying or transmission of the desired data frames will occur through the retrieval module 32.

FIG. 6 illustrates an alternative avionics data network 224 according to a third embodiment of the disclosure. The third embodiment has some similarities to the first and second embodiments; therefore, like parts will be identified with like numerals increased by 200, with it being understood that the description of the like parts of the first and second embodiments applies to the third embodiment, unless otherwise noted. A difference between the earlier embodiments and the third embodiment is that the system 218 can include a memory 240 or data storage device that is commonly accessible by the retrieval module 232 and the processing module 230, by way of respective communications data buses 236, which can have the same or a different configuration of the data communications bus 36 connecting the processing module 230, end system 34, or retrieval module 232. In the illustrated configuration, the retrieval module 232 can be configured to store the retrieved data frames directly in the common memory 240 for immediate accessing by the processing module 230 or first processor 38.

Embodiments of the disclosure shown in FIG. 6 can further include logic configured to ensure that the retrieval module 232 and the processing module 230 would not be accessing a common memory 240 location simultaneously. Furthermore, while the common memory 240 is illustrated apart from the processing module 230 and the retrieval module 232, embodiments of the disclosure are envisioned wherein the common memory 240 is a subcomponent of the processing module 230, the retrieval module 232, or another commonly-accessible component of the system 218.

Many other possible embodiments and configurations in addition to that shown in the above figures are contemplated by the present disclosure. Additionally, the design and placement of the various components can be rearranged such that a number of different in-line configurations could be realized.

The embodiments disclosed herein provide an apparatus and method for operating a system in an avionics data network. The technical effect is that the above described embodiments enable the operation of retrieving data frames from an end system 34 by utilizing a retrieval module 32, such that the processing module 30 is free to perform other processing tasks during the retrieval. One advantage that can be realized in the above embodiments is that the inefficiencies and underutilization of the first processor of the processing module during retrieval of data frames from the system, as described above, are reduced or eliminated, freeing the first processor or processing module to perform processing tasks while the retrieval module perform the data frame retrieval. Another advantage of the above-described embodiments is that the second processor of the retrieval module can be a less robust, lower power, or less capable processor, compared to the first processor, since the processing tasks executed by the second processor are specific and less demanding than the general processing tasks of the first processor. Typically a less capable processor has lower costs than a more capable processor.

Yet another advantage of the above-described embodiments is that when the retrieval module has retrieved the identified subset of data frames, the copying or transmission of the subset of data frames can be batch-transferred to the processing module without the inefficiencies or underutilization of the end system interactions, resulting in an increased utilization of the first processor when receiving the subset of data frames. The increase in utilization by the first processor can further result in a less capable processor being selected for processing tasks, yet perform the required processing tasks in the same time or under the same constraints, due to the increased utilization and efficiency. Furthermore, the retrieval module can be configured to interact with a variety of end systems or a variety of specialized protocol networks, as needed, and thus, is appropriate in a number of different industries and applications To the extent not already described, the different features and structures of the various embodiments can be used in combination with others as desired. That one feature cannot be illustrated in the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft communications system, comprising:
an application-specific integrated circuit end system configured to interface with an ARINC 664 part 7 (A664) network protocol and having a data ingress port to receive a set of data frames transmitted from the A664 network protocol, and a storage unit for storing the set of data frames received by the data ingress port;
a retrieval module configured to interface with the end system and having a predetermined set of interactions for retrieving an identified set of data frames from the storage unit of the end system; and
a processing module configured to interface with the retrieval module and having a first processor configured to identify a subset of the data frames received by the end system for processing operations and to perform processing operations on the subset of data frames,
wherein the processing module identifies the subset of data frames necessary for processing operations and provides the identified subset of the data frames to the retrieval module for retrieval from the end system, such that the processing module is available to perform processing operations during the retrieval of the subset of the data frames by the retrieval module,
wherein the retrieval module is communicatively positioned between the processing module and the end system, and
wherein all transmission of the desired data frames occurs through the retrieval module.

2. The system of claim 1 wherein the retrieval module further comprises a second processor configured to execute the predetermined set of interactions.

3. The system of claim 2 wherein the second processor is a field-programmable gate array.

4. The system of claim 2 wherein the second processor is at least one of less capable, less powerful, lower performance, less robust, or operates using less power, compared with the first processor.

5. The system of claim 1 wherein the processing module is an aircraft health management unit.

6. The system of claim 5 wherein the processing module and the end system interface by way of a common data bus.

7. The system of claim 6 wherein the common data bus is at least one of a peripheral component interconnect (PCI) data bus, or a peripheral component interconnect express (PCIe) data bus, the system further comprising:
a first memory in the processing module;
a second memory in the retrieval module; and
a third memory in the end system,
wherein data frames stored in the first memory are copies or transmissions of data frames stored in the third memory.

8. A method of operating an aircraft communications system, comprising:
receiving, by an end system, at an ARINC 664 part 7 (A664) network interface configured for the A664 network protocol, a set of data frames and storing the received set of data frames for later retrieval;
identifying, by a processing module, a list of a subset of the data frames for the processing module;
providing, by the processing module, the identified list of the subset of data frames to a retrieval module;
retrieving, by the retrieval module, the subset of data frames identified by the list from the A664 network interface, while the processing module is available to complete other tasks; and
upon completion of the retrieving, providing the subset of data frames identified by the list to the processing module,
wherein the retrieval module is communicatively positioned between the processing module and the end system, and
wherein all transmission of the desired data frames occurs through the retrieval module.

9. The method of claim 8 wherein the providing the subset of data frames identified by the list to the processing module further comprises storing the subset of data frames to a memory commonly accessible by the retrieval module and the processing module.

10. The method of claim 8 wherein the providing the subset of data frames identified by the list to the processing module further comprises indicating to the processing module that the subset of data frames have been retrieved, and upon processing module confirmation, transmitting the subset of data frames from the retrieval module to the processing module.

11. The method of claim 8 wherein the retrieving the subset of data frames identified by the list from the A664 network interface includes at least one of a delay period or a wait period, and
wherein the processing module can perform at least a subset of the processing routines contemporaneously with the retrieving step by the retrieval module.

12. The method of claim 11 wherein the at least one of the delay period or the wait period is at least partially defined by the A664 network protocol.

13. The method of claim 12 further comprising performing a processing operation on the subset of the data frames, by the retrieval module, prior to providing the subset of data frames identified by the list to the processing module,
wherein the retrieval module is communicatively coupled with both the end system and the processing module.

14. The method of claim 13 wherein the identifying in a list further comprises identifying in the processing module, a queue having the subset of data frames, wherein the processing module appends data frames to the queue as they are identified.

15. The method of claim 14 wherein the retrieving further comprises retrieving the identified subset of data frames of the queue, and
wherein the processing module identifies a subset of the processing routines that are dependent upon data frames that have yet to be retrieved by the retrieval module.

16. The method of claim 15 wherein the retrieving is initiated at the expiration of a predetermined period of time, the method further comprising:
providing indication to the processing module that the retrieving step has completed.

17. The method of claim 15 wherein the retrieving is initiated when the queue includes a predetermined number of identified data frames.

18. A method of operating an aircraft communications system, comprising:
receiving, by an end system, at an ARINC 664 part 7 (A664) network interface configured for the A664 network protocol, a set of data frames and storing the received set of data frames for later retrieval, the end system further comprising a third memory;
identifying, by a processing module, a list of a subset of the data frames for the processing module, the processing module comprising a first memory;
providing, by the processing module, the identified list of the subset of data frames to a retrieval module, the retrieval module comprising a second memory;
retrieving, by the retrieval module, the subset of data frames identified by the list from the A664 network interface; and
upon completion of the retrieving, providing the subset of data frames identified by the list to the processing module;
wherein the processing module performs a set of processing routines not including the retrieving the subset of data frames identified by the list,
wherein the processing module is an aircraft health management unit,
wherein the processing module and the end system interface by way of a common data bus, and
wherein data frames stored in the first memory are copies or transmissions of data frames stored in the third memory.

19. The method of claim 18, wherein the processing module performs at least a subset of the set of processing routines contemporaneously with the retrieval module retrieving the subset of data frames identified by the list.

20. The method of claim 19, wherein the processing module performs at least a subset of the set of processing routines that are not dependent on the subset of data frames identified by the list.

* * * * *